(12) United States Patent
Priha et al.

(10) Patent No.: US 9,586,275 B2
(45) Date of Patent: Mar. 7, 2017

(54) APPARATUS FOR MACHINING A TUBULAR PIECE

(75) Inventors: Mika Petteri Priha, Helsinki (FI);
Seppo Antero Makkonen, Helsinki (FI)

(73) Assignee: EXACT TOOLS OY, Helsinki (FI)

( * ) Notice: Subject to any disclaimer, the term of this patent is extended or adjusted under 35 U.S.C. 154(b) by 305 days.

(21) Appl. No.: 14/130,509

(22) PCT Filed: Jul. 6, 2012

(86) PCT No.: PCT/FI2012/050718
§ 371 (c)(1),
(2), (4) Date: Jan. 2, 2014

(87) PCT Pub. No.: WO2013/004918
PCT Pub. Date: Jan. 10, 2013

(65) Prior Publication Data
US 2014/0150266 A1   Jun. 5, 2014

Related U.S. Application Data

(60) Provisional application No. 61/506,190, filed on Jul. 11, 2011.

(30) Foreign Application Priority Data

Jul. 6, 2011   (FI) ...................................... 20115728

(51) Int. Cl.
*B23D 21/08*   (2006.01)
*B23D 21/00*   (2006.01)
*B23D 45/12*   (2006.01)

(52) U.S. Cl.
CPC ............. *B23D 21/08* (2013.01); *B23D 21/00* (2013.01); *B23D 45/124* (2013.01); *Y10T 29/49* (2015.01)

(58) Field of Classification Search
CPC ...... B23D 21/00; B23D 21/08; B23D 45/124; Y10T 29/49
See application file for complete search history.

(56) References Cited

U.S. PATENT DOCUMENTS 504,786 A * 9/1893 Jungmann .............. B23D 21/10
30/95
1,699,027 A    1/1928 Scott
(Continued)

FOREIGN PATENT DOCUMENTS

DE    40 13 470 A1 * 10/1991
GB         29211   * 10/1913
(Continued)

OTHER PUBLICATIONS

International Search Report dated Nov. 9, 2012, corresponding to PCT/FI2012/050718.
(Continued)

*Primary Examiner* — Hwei C Payer
(74) *Attorney, Agent, or Firm* — Young & Thompson

(57) ABSTRACT

An apparatus for machining a tubular piece, wherein the apparatus includes a frame element, support rollers, which are associated with the frame element, support a workpiece and rotate the same around its longitudinal axis. In addition, the frame element is provided with a machining unit adapted to be movable towards and away from the workpiece. The machining unit includes a tool member, such as for example a cutting tool, as well as support wheels adapted to bear against a workpiece. The machining unit is arranged to link up with the frame element through the use of an auxiliary frame element adapted to clamp itself thereto at not less than two support points, for example through the use of a self wedging assembly implemented with an indentation.

15 Claims, 2 Drawing Sheets

(56) References Cited

U.S. PATENT DOCUMENTS

| | | | | |
|---|---|---|---|---|
| 2,870,536 A * | 1/1959 | Lutsker | ............ | B23D 21/08 30/102 |
| 3,371,565 A * | 3/1968 | Mayfield | ............ | B23B 5/168 82/128 |
| 3,608,194 A * | 9/1971 | Miller | ............ | B23D 21/08 30/102 |
| 3,756,100 A * | 9/1973 | Bachmann | ............ | B23D 21/00 82/113 |
| 4,072,073 A * | 2/1978 | Birkestrand | ............ | B23D 21/00 82/101 |
| 4,108,029 A * | 8/1978 | Borzym | ............ | B23D 21/00 83/300 |
| 4,114,485 A * | 9/1978 | Coblitz | ............ | B23B 5/168 30/95 |
| 4,268,959 A * | 5/1981 | Taira | ............ | B23D 21/10 30/94 |
| 4,279,181 A * | 7/1981 | Birkestrand | ............ | B23D 21/00 30/101 |
| 4,305,205 A | 12/1981 | Girala | | |
| 4,443,943 A | 4/1984 | Maruyama | | |
| 5,027,681 A * | 7/1991 | Hyvarinen | ............ | B23D 45/046 30/94 |
| 5,933,963 A | 8/1999 | Pierce | | |
| 6,189,216 B1 | 2/2001 | Dureiko | | |
| 6,226,823 B1 * | 5/2001 | Ma Gee | ............ | B23D 21/08 30/102 |
| 6,666,062 B2 * | 12/2003 | Dole | ............ | B21D 17/04 72/102 |
| 7,257,895 B2 * | 8/2007 | Makkonen | ............ | B23D 45/124 269/242 |
| 2014/0150266 A1 * | 6/2014 | Priha | ............ | B23D 21/00 30/102 |

FOREIGN PATENT DOCUMENTS

| | | | |
|---|---|---|---|
| GB | 1 487 033 | * | 9/1977 |
| GB | 2288353 A1 | | 10/1995 |
| JP | 2004174690 | | 6/2004 |
| JP | 2008062313 | | 3/2008 |
| KR | 101001283 | | 12/2010 |
| WO | 8806934 A1 | | 9/1988 |
| WO | WO 2011/037425 A3 | * | 3/2011 |

OTHER PUBLICATIONS

Finnish Search Report dated Mar. 27, 2012, corresponding to the Foreign Priority FI 20115728.

* cited by examiner

APPARATUS FOR MACHINING A TUBULAR PIECE

BACKGROUND OF THE INVENTION

Field of the Invention

The invention relates to an apparatus for machining, such as for example cutting, a tubular piece. The apparatus can also be used for some other type of machining a piece, such as for example finishing the surfaces and ends.

PRIOR ART

The prior art discloses various devices for machining, especially cutting, a tubular piece. It is prior known to cut round section pipes for example with disc cutting devices, wherein either the pipe is rotating or the cutting disc is rotating around a pipe. The use of cutting discs ranges from fully automated disc cutting devices to manually rotated pipe cutters. One exemplary prior art apparatus is a Ridgid pipe cutter, wherein the pipe to be cut is rotated by means of an electric motor and a linear movement of the tool against the pipe is achieved manually. The apparatus has a C-shaped frame element, having its bottom section provided with pipe-turning rollers and its top section with a disc tool movable relative to a pipe to be cut (sort of like a drill bit movable in column type drilling machines).

A problem with such equipment is, among others, that in order to be sufficiently robust for example to withstand the considerable forces generated by the rotation of an asymmetric pipe, the device structure will become quite heavy and thus not very easily transportable on worksites. In addition, as a result of its fixed C-shaped frame element, the device is only applicable for pipes of a given diameter range, whereby, with highly diverse pipe sizes, it is necessary to use pipe cutters with various size frame structures. Still moreover, it is often necessary to attach the prior known device to a worktable, which complicates and hinders the use of the device.

SUMMARY

One objective of the invention is to eliminate or at least to alleviate drawbacks associated with the prior art. According to one embodiment, the invention endeavors to offer such an apparatus for machining a tubular piece, wherein the apparatus could be made both light-structured and easily movable, yet at the same time sufficiently durable and sturdy in its structure. Another objective is to provide such an apparatus that would enable machining pipes of quite diverse diametrical sizes, as well as using the apparatus for finishing the workpieces.

According to a first embodiment of the invention, the apparatus for machining, such as cutting, a tubular or round-bar type piece comprises a frame element and support rollers associated with the frame element and supporting a workpiece and rotating the same around its longitudinal axis. In addition, the frame element is provided with a machining unit adapted to be movable towards the workpiece. The machining unit comprises a tool member, such as for example a cutting tool, as well as support wheels adapted to bear against the workpiece. Said machining unit is arranged to link up with the frame element through the use of an auxiliary frame element adapted to clamp itself thereto at not less than two support points. The support points are most preferably disposed in such a way that the support rollers are left between said at least two support points. A benefit obtained thereby, among others, is that the forces generated by a pipe to be machined can be managed symmetrically in terms of their geometry, which enables making the apparatus remarkably light-structured with respect to those of the prior art.

According to one embodiment, the machining unit comprises at least one tool member, for example a cutting tool, such as a disc tool which is most preferably adapted to move towards a workpiece in a substantially perpendicular direction. It should be noted, however, that there may be more than one tool member, for example two or three disc tools, and that the tool member can also be adapted to move at another angle towards a workpiece, for example at an angle of 30°, 45° or 60°.

According to one embodiment of the invention, the machining unit links up with an auxiliary frame element by way of guides and is adapted to be movable relative to the auxiliary frame and towards or away from support rollers and/or a workpiece through the intermediary of an adjustment element in a substantially stepless or continuous manner. The adjustment element can be for example an adjustment element implemented by way of a threaded shaft, one end of which is fitted with a machining unit, a tool member and/or support wheels, and which adjustment element links up with the auxiliary frame element by way of the thread. Accordingly, when the adjustment element is rotated, its position, and at the same time also the position of the machining unit, the tool member and/or the support wheels, is changed relative to the auxiliary frame element essentially in a vertical direction of the apparatus, in other words either towards or away from a workpiece.

According to one embodiment of the invention, the support wheels are adapted to be movable essentially towards or away from support rollers and/or a workpiece for example independently of a cutting tool and its axle mounting. According to the embodiment, the support wheels are most preferably adapted to clamp at least in two different positions relative to the machining unit. Thus, the employed tool member may comprise for example cutting tools of various sizes for materials of various thicknesses or otherwise diverse properties. In addition, the support wheels can be clamped in such a position with respect to a tool member that the tool member does not touch a workpiece. Thus, the support wheels press a piece firmly against the piece-turning support rollers, whereby the apparatus becomes a device (lathe) rotating the piece in axial direction. This increases versatility of the apparatus and makes the apparatus highly useful for example for machining work other than just cutting a pipe, for example for finishing the ends and surface of a workpiece, especially for removing internal burr by means of various tools.

The apparatus comprises most preferably a motor, such as a battery powered or mains powered electric motor, which is adapted to rotate at least one of said support rollers. The motor is adapted to rotate the support roller and thereby a workpiece. According to one embodiment, the rotation speed can be regulated for example in a stepwise or stepless manner. In addition, the rotation direction of a motor and thereby support rollers and hence a workpiece can be reversed. A reversal of the rotation direction assists for example in the machining of welding joints or other hard spots or for example thicker parts of the wall by enabling the pipe to be rotated back and forth for enhanced machining operation.

According to one embodiment of the invention, the support roller may comprise a groove or another such marking, which is more preferably disposed in such part of the support roll where it indicates a contact point on the workpiece surface for a tool member, for example a cutting tool. This facilitates and expedites the installation of a workpiece in the apparatus.

The tool member, such as a cutting tool, is most preferably disposed on a vertical center axis of the apparatus, and the support rollers as well as, respectively, the support points for an auxiliary frame element are disposed symmetrically on either side of said center axis. Thus, the forces applied to the apparatus assembly during a machining operation can be controlled symmetrically in terms of their geometry and the apparatus assembly can be made quite light-structured, yet become very robust and stable.

According to one embodiment of the invention, the tool member, for example a cutting tool, is axle-mounted on the machining unit in such a way that the support wheels or their suspension elements in a machining position (such as in a cutting position) prevent a displacement the axle out of the axle hole. Moreover, in another position, said elements enable an extraction of the axle and thereby a removal of the cutting tool. This provides the advantage that, when cutting for example pieces of unequal wall thicknesses, the cutting tool can be replaced very quickly indeed, because the cutting tool axle need not be secured with any separate mechanism, but the support wheels or their suspension elements maintain the axle in place during a machining operation.

According to one embodiment of the invention, the machining unit, the tool member and/or the support wheels are adapted to link up with the auxiliary frame element or the frame element in a vertically spring-cushioned manner. The spring mounting can be implemented for example by means of belleville springs. Hence, the forces generated for example by the asymmetry of a pipe do not damage the apparatus assembly or for example the cutting tool as the excess force can be concentrated for example on deformation of the springs.

According to one embodiment of the invention, the support wheels are adapted to be at least partially compressible and/or are spring-cushioned. Thus, the support wheels can for example be adjusted to a firm attachment with the surface of a pipe to be machined and furthermore to press the pipe to be machined firmly against the pipe-turning support rollers, whereby the pipe to be machined can be set in better rotation by virtue of increased friction and without the pipe slipping relative to the support rollers rotating the same or in axial direction. The support wheels can be manufactured for example from polyurethane, rubber or the like, or at least coated with such material for increased friction. In addition, the support wheels are most preferably adapted to make contact with a workpiece substantially before the tool member, such as a cutting tool, whereby the support wheels protect the tool as the piece is placed in its position. Still furthermore, the support wheels can be installed at a toe-out angle, which further stabilizes the workpiece in axial direction.

According to one embodiment of the invention, the auxiliary frame element of the apparatus links up with the frame element through the intermediary of guides, such that the machining unit associated with the auxiliary frame element can have its distance from the support rollers adjusted for example to comply with workpieces of various sizes, thus enabling the machining unit's actual range of motion needed in the course of a machining operation, as well as the length of the machining unit's arm, to be minimized. A benefit achieved by this is i.a. the ability to minimize the moments of considerable forces generated for example by asymmetrical workpieces, whereby i.a. the auxiliary frame element can be made remarkably light-structured.

The auxiliary frame element can be adapted for clamping itself to the frame element for example by way of a self wedging assembly, which can be implemented for example by means of an indentation and a wedge type clamping mechanism fitted therein. Alternatively, the clamping can also be implemented by other means, such as for example by disc brakes, whereby the auxiliary frame element can be moved relative to the frame element through the intermediary of guides in a substantially stepless or continuous manner. The auxiliary frame element is most preferably adapted to clamp itself in at least two different positions with respect to the frame element, such that the clamping in a first position enables pieces of a first diametrical size to be inserted between the support rollers and the machining unit, and the clamping in a second position enables pieces of a diametrical size other than the first size pieces to be inserted between the support rollers and the machining unit. The more indentations for example are provided on the frame element, the more diverse are the sizes of pieces that can be machined with the apparatus. According to one example, the apparatus enables machining pieces with a diametrical size at least in the order of 10 mm to 120 mm, yet without being limited to these explicit values.

One embodiment of the invention relates also to a manufacturing method for an apparatus presented in this document, wherein the apparatus for machining, for example cutting a tubular piece is provided with a frame element, as well as with support rollers which are linked up with the frame element, support a workpiece and rotate the same around its longitudinal axis. In addition, the apparatus is provided with a machining unit, which is linked up with the frame element and adapted to be movable towards a workpiece, such that the machining unit comprises support wheels adapted to bear against the workpiece. Still furthermore, the machining unit is adapted to link up with the frame element by way of an auxiliary frame element adapted to clamp itself thereto at not less than two different distances from the support rollers.

The invention offers distinct advantages over solutions known from the prior art. The apparatus according to the invention is light in structure and readily transportable, yet at the same time highly durable. In addition, it is easy to use and versatile, and it can be used i.a. for setting pipes in rotation and simultaneous cutting, but also for performing lathe and other machining operations on pieces. Still furthermore, the apparatus design enables a high-speed replacement of tool members, for example a cutting tool, whereby the apparatus enables pipes of diverse materials and unequal wall thicknesses to be cut easily and quickly for example by replacing the tool with another one of different size or type.

The apparatus according to the invention provides also for a reliable support for the tool, and the support wheels which are at least partially made of an elastic material, and/or are spring-cushioned, make it possible to apply an evenly distributed load on a workpiece, even if the piece were possibly slightly asymmetrical, for example flattened. This reduces resistance which builds up for example in the process of machining copper pipes and as the tool penetrates through the pipe wall. Without sufficient friction between the support wheels and the piece, such a resistance may stall the machining operation as the support rollers or the support wheels begin to slip relative to a presently machined pipe, especially when the pipes are asymmetrical. The elastic surfaced and/or spring-cushioned support wheels enable a pipe to continue its rotation after the tool has penetrated through the pipe wall, even if the pipe were asymmetrical. Most preferably, the support wheels are adapted to make contact with the surface of a workpiece before the tool member, for example a cutting tool, whereby the pipe is set in rotation before the tool engages its surface, which increases i.a. the tool's service life. In addition, the support wheels protect the tool from inadvertent contacts with a pipe, which could easily damage the tool. Still furthermore, the support wheels protect the operator by reducing the risk of the operator accidentally placing for example his/her finger against the tool or between the tool and a workpiece.

In addition, the support wheels can be adjusted in such a way that the machining unit has only its support wheels engaging a workpiece, but that the tool member does not touch the workpiece. Thereby, the support wheels prop up a workpiece on the support rollers, which only rotate the workpiece, thus enabling the piece to be machined for example with tools other than the machining unit's tool members.

DESCRIPTION OF THE FIGURES

In the next section, preferred embodiments of the invention will be described in slightly more detail with reference to the accompanying figures, in which.

DETAILED DESCRIPTION OF THE FIGURES

Figure 1:
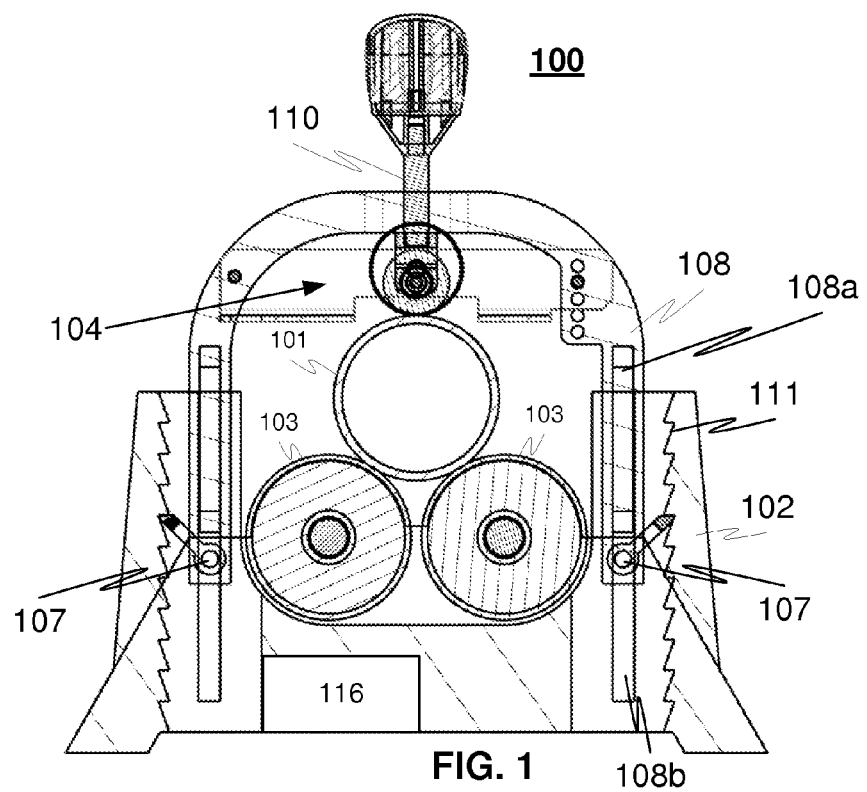
FIG. 1 shows one exemplary apparatus in a side view according to one preferred embodiment of the invention.
Figure 2:
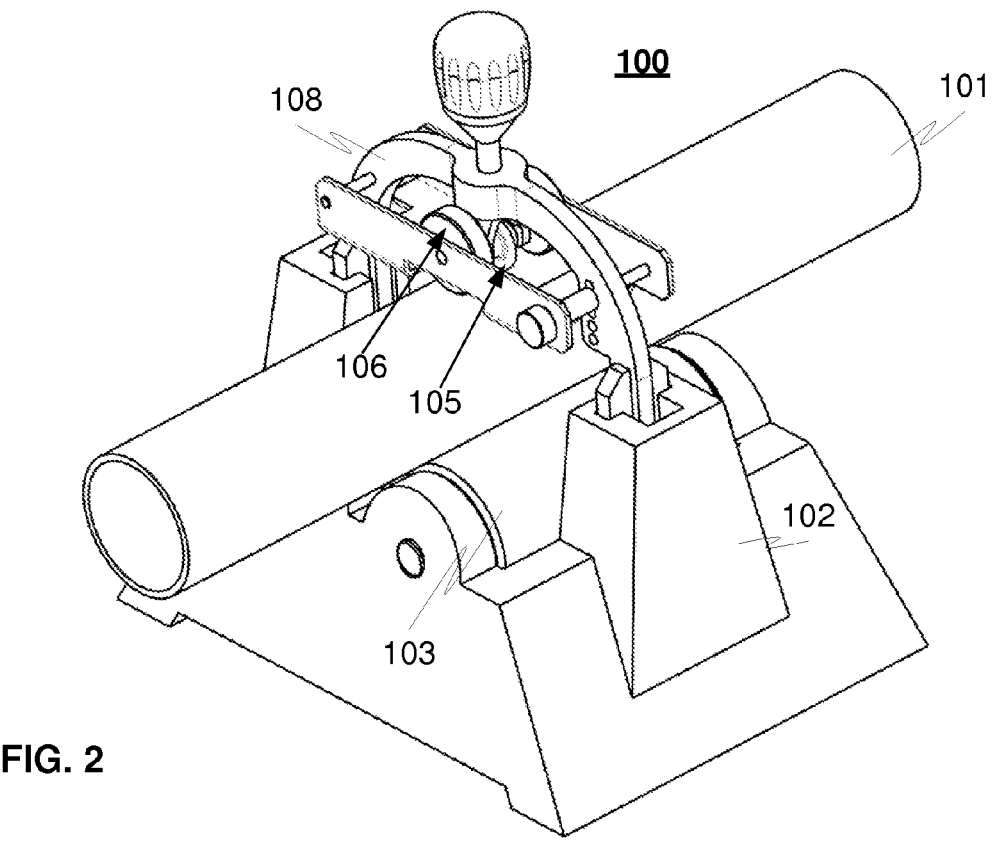
FIG. 2 shows a perspective view of one exemplary apparatus according to one preferred embodiment of the invention.

FIG. 1 shows a side view and FIG. 2 a perspective view of one exemplary apparatus 100 for machining, for example cutting, a tubular piece 101 according to one preferred embodiment of the invention. The apparatus comprises a frame element 102, and support rollers 103 which are associated with the frame element, support a workpiece and rotate the same around its longitudinal axis. The frame element is further provided with a machining unit 104 adapted to be movable towards and away from a workpiece. The machining unit comprises a tool member, such as for example a cutting tool 105, as well as support wheels 106 adapted to bear against the workpiece 101. Said machining unit 104 is adapted to link up with the frame element 102 through the intermediary of an auxiliary frame element 108 adapted to clamp itself to the frame element 102 at not less than two support points 107.

The auxiliary frame element 108 links up with the frame element 102 through the intermediary of guides 108a, 108b, such that the machining unit 104 associated with the auxiliary frame element can have its distance from the support rollers 103 adjusted easily and quickly for example to comply with workpieces of various sizes. FIG. 1 shows one example, in which the auxiliary frame element 108 is adapted to clamp itself to the frame element 102 through the intermediary of a self wedging assembly 111 provided with an indentation. The apparatus is also preferably provided with a release mechanism (not shown in the figures). It should be noted, however, that according to one embodiment the clamping mechanism can also be constructed by other means, for example by means of a disc brake or the like.

The apparatus comprises a motor 116 typically adjustable in terms of the speed and direction of its rotation, most preferably a battery powered electric motor, which is adapted to rotate at least one of the support rollers 103.

Figure 3:
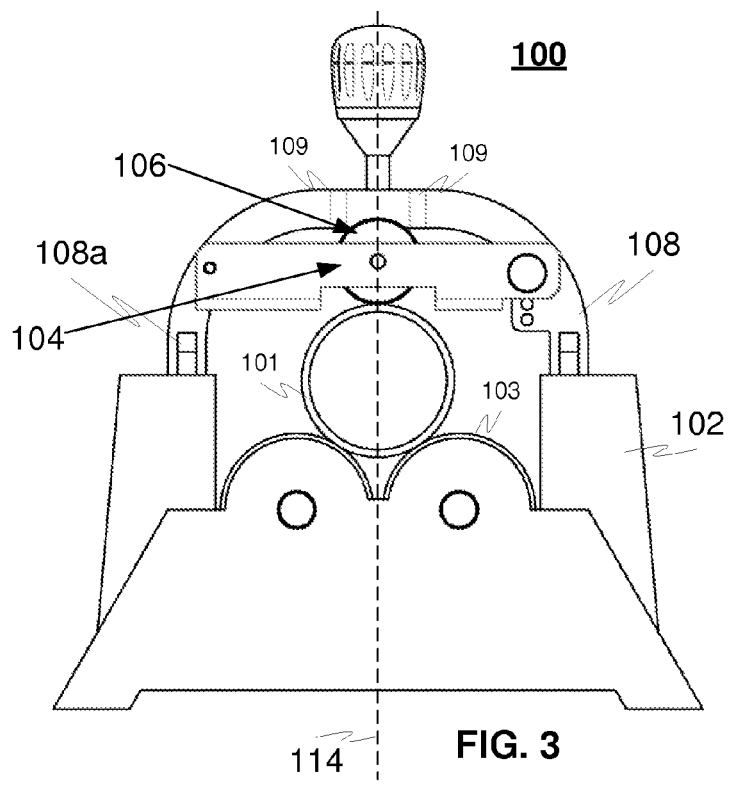
FIG. 3 shows one exemplary apparatus in a side view according to one preferred embodiment of the invention.

FIG. 3 shows one exemplary apparatus 100 in a side view according to one preferred embodiment of the invention, wherein the machining unit 104 links up with the auxiliary frame element 108 through the intermediary of guides 109. The machining unit 104 is adapted to be moved with respect to the auxiliary frame element 108 and towards or away from the support rollers 103 or the piece 101 through the intermediary of an adjustment element 110. The adjustment element can be for example an adjustment element implemented by means of a threaded shaft, on one end of which is mounted the machining unit, the tool member and/or the support wheels, and which adjustment element links up with the auxiliary frame element through the intermediary of a thread.

As can be seen i.a. from the exemplary FIG. 3, the apparatus has its geometry highly symmetrical with respect to a vertical center axis 114. For example the cutting tool 105 is disposed substantially on the vertical center axis 114 of the apparatus, and the support rollers 103 as well as the support points 107 for the auxiliary frame element 108 symmetrically on either side of said center axis 114.

Figure 4:
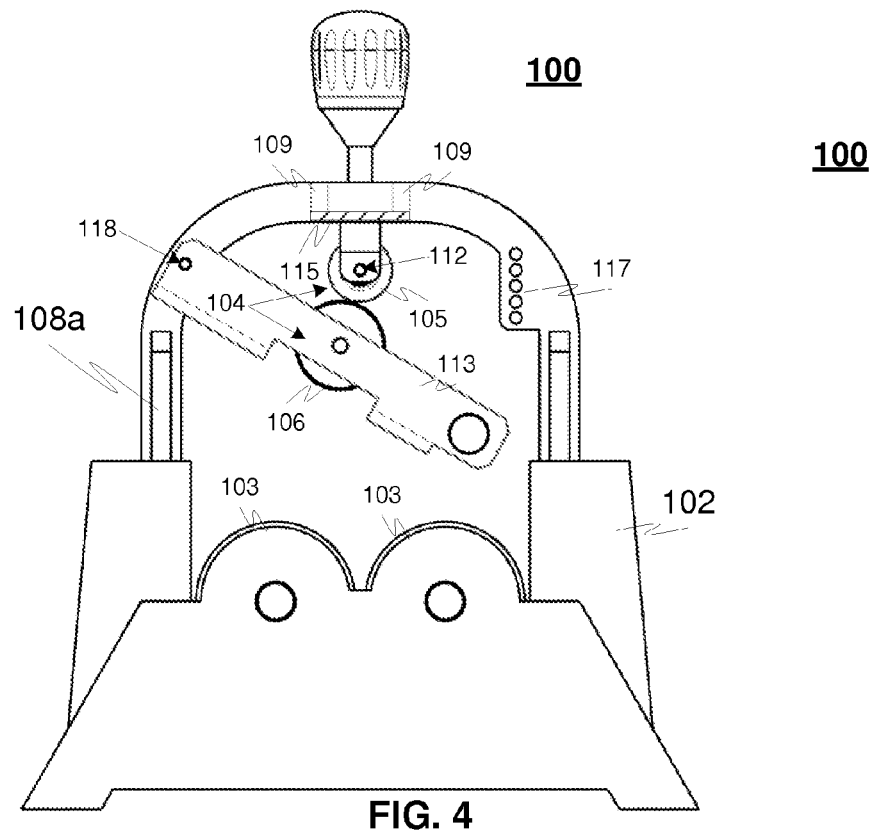
FIG. 4 shows one exemplary machining unit according to one preferred embodiment of the invention.

FIG. 4 shows one exemplary machining unit 104 according to one preferred embodiment of the invention, in which the support wheels 106 are mounted on the support wheels' suspension elements 113 and adapted to be moved essentially towards or away from the support rollers or the piece independently of the tool member 104, specifically the cutting tool 105. Most preferably, the suspension elements are axle-mounted 118 at one end thereof to the machining unit 104. In addition, the support wheels 106 are preferably adapted to clamp themselves in at least two different positions 117 relative to the machining unit 104 for example through the intermediary of various positions of the suspension elements. Depending on the selected position, the support wheels 106 can be adapted to make contact with a workpiece substantially before a tool member, such as the cutting tool 105.

The tool member, for example the cutting tool 105, is axle-mounted 112 to the machining unit 104 in such a way that, in a working position (e.g. in a cutting position), the support wheels 106 or their suspension elements 113 prevent a movement of the axle 112 out of the axle hole. Respectively, in at least one other position, the suspension elements 113 enable extraction of the axle 112 and thereby for example dismounting of the cutting tool 105. In addition, the machining unit 104, the tool member 105 and/or the support wheels 106 are adapted to link up with the auxiliary frame element 108 or the frame element 102 in a spring-cushioned manner 115 for example by means of belleville springs 115.

Presented above are just a few embodiments for a solution of the invention. The principle according to the invention can naturally be diversified within the scope of protection defined by the claims, regarding for example implementation details as well as fields of use. The apparatus according to the invention is particularly useful for cutting pipes of steel, copper or cast iron.

The invention claimed is:
1. An apparatus for machining, or cutting, a tubular piece, comprising:
   a frame element;

support rollers, which are associated with the frame element, configured to support a workpiece and rotate the workpiece around a longitudinal axis of the workpiece; and a machining unit adapted to be movable towards the workpiece, wherein the machining unit comprises support wheels adapted to bear against the workpiece, wherein the machining unit is arranged to link up with the frame element through use of an auxiliary frame element, the auxiliary frame element being adapted to be clamped to the frame element via at least two support points at least two different distances from the support rollers, and said support rollers are located between said at least two support points, wherein the support wheels are adapted to be movable essentially towards or away from the support rollers independently of at least one cutting tool, and wherein the support wheels are adapted to clamp themselves in at least two different positions with respect to the machining unit.

2. The apparatus according to claim 1, wherein the machining unit comprises at least one cutting tool.

3. The apparatus according to claim 1, wherein the machining unit links up with said auxiliary frame element by way of guides and is adapted to be movable relative to the auxiliary frame element and towards or away from the support rollers by means of an adjustment element in a substantially stepless/continuous manner.

4. The apparatus according to claim 1, wherein the machining unit, the tool at least one cutting and/or the support wheels are adapted to link up with the auxiliary frame element or the frame element in a spring-cushioned manner or by means of belleville springs.

5. The apparatus according to claim 1, wherein the support wheels are adapted to be at least partially compressible and/or spring-cushioned with respect to the machining unit.

6. The apparatus according to claim 1, wherein the support wheels are adapted to make contact with the workpiece substantially before the at least one cutting tool.

7. The apparatus according to claim 1, wherein the support wheels are set at a toe-out angle.

8. The apparatus according to claim 1, wherein the auxiliary frame element links up with said frame element by way of guides.

9. The apparatus according to claim 1, wherein the auxiliary frame element is adapted to be movable relative to the frame element and towards or away from the support rollers in a substantially stepless manner, or wherein the auxiliary frame element is adapted to clamp itself to said frame element through the intermediary of a self wedging assembly.

10. The apparatus according to claim 1, wherein the auxiliary frame element is adapted to clamp itself in at least two different positions relative to the frame element, such that the clamping in a first position enables pieces of a first diametrical size to be inserted between the support rollers and the machining unit, and the clamping in a second position enables pieces of a diametrical size other than the first size pieces to be inserted between the support rollers and the machining unit.

11. The apparatus according to claim 1, wherein the at least one cutting tool, is axle-mounted to said machining unit in such a way that, in a working position, the support wheels or their suspension elements prevent a movement of an axle out of an axle hole formed in the at least one cutting tool.

12. The apparatus according to claim 1, wherein the apparatus comprises a motor, or a battery-powered electric motor, which is adapted to rotate at least one of said support rollers.

13. The apparatus according to claim 1, wherein the at least one cutting tool, is disposed essentially on a vertical center axis of the apparatus, and the support rollers as well as the support points for the auxiliary frame element are disposed symmetrically on either side of said center axis.

14. The apparatus according to claim 1, wherein at least one of the support rollers comprises a groove to indicate the point of contact for the at least one cutting tool, on a surface of the workpiece.

15. A manufacturing method for an apparatus, comprising:

providing a frame element;

linking up support rollers with the frame element;

supporting a workpiece and rotating the workpiece around a longitudinal axis of the workpiece, with the support rollers;

linking up a machining unit with the frame element;

moving the machining unit towards the workpiece;

bearing support wheels of the machining unit against the workpiece;

linking up the machining unit with the frame element through the use of an auxiliary frame element; and clamping the auxiliary frame element to the frame element via at least two support points at at least two different distances from the support rollers, and said support rollers are located between said at least two support points, wherein the support wheels are moving essentially towards or away from the support rollers independently of at least one cutting tool, and wherein the support wheels are clamping themselves in at least two different positions with respect to the machining unit.

\* \* \* \* \*